(12) United States Patent
Guo et al.

(10) Patent No.: US 11,089,305 B2
(45) Date of Patent: Aug. 10, 2021

(54) VIDEO FRAME CODING METHOD DURING SCENE CHANGE, TERMINAL AND STORAGE MEDIUM

(71) Applicant: Tencent Technology (Shenzhen) Company Limited, Shenzhen (CN)

(72) Inventors: Yaoyao Guo, Shenzhen (CN); Xunan Mao, Shenzhen (CN); Chenchen Gu, Shenzhen (CN); Xinwei Gao, Shenzhen (CN); Jing Lv, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/426,915

(22) Filed: May 30, 2019

(65) Prior Publication Data

US 2019/0281300 A1 Sep. 12, 2019

Related U.S. Application Data

(63) Continuation of application No. PCT/CN2018/095378, filed on Jul. 12, 2018.

(30) Foreign Application Priority Data

Aug. 17, 2017 (CN) .......................... 201710707503.6

(51) Int. Cl.
*H04N 19/126* (2014.01)
*H04N 19/142* (2014.01)
(Continued)

(52) U.S. Cl.
CPC ............. *H04N 19/126* (2014.11); *H04N 7/00* (2013.01); *H04N 19/00* (2013.01);
(Continued)

(58) Field of Classification Search
CPC .... H04N 19/00; H04N 19/124; H04N 19/126; H04N 19/142; H04N 19/146;
(Continued)

(56) References Cited

U.S. PATENT DOCUMENTS

| 5,617,150 A * | 4/1997 | Nam | ............... H04N 19/503 |
|---|---|---|---|
| | | | 348/700 |
| 6,192,154 B1 * | 2/2001 | Rajagopalan | ........ H04N 19/176 |
| | | | 375/240.03 |

(Continued)

FOREIGN PATENT DOCUMENTS

| CN | 1801935 A | 7/2006 |
|---|---|---|
| CN | 101188755 A | 5/2008 |

(Continued)

OTHER PUBLICATIONS

Tencent Technology, WO, PCT/CN2018/095378, Sep. 29, 2018, 3 pgs.

(Continued)

*Primary Examiner* — Jessica M Prince
(74) *Attorney, Agent, or Firm* — Morgan, Lewis & Bockius LLP

(57) ABSTRACT

Disclosed are a video frame coding method performed at a terminal. The method includes: obtaining and coding an $i^{th}$ video frame in a group of pictures, and counting a quantity of actually consumed bits corresponding to the $i^{th}$ video frame; detecting a state of the $i^{th}$ video frame based on the quantity of actually consumed bits, an initial average bit rate of the group of pictures, a quantization model, and a video frame detection rule, and determining multiple quantization parameters of a $(i+1)^{th}$ video frame; and determining first quantities of allocated bits for compensation of first to-be-compensated video frames; updating the first coding rule according to a first quantity of allocated bits for compensa- (Continued)

tion, the quantization parameters corresponding to the $(i+1)^{th}$ video frame, and coding the $(i+1)^{th}$ video frame.

20 Claims, 6 Drawing Sheets

(51) Int. Cl.
  *H04N 19/172* (2014.01)
  *H04N 19/48* (2014.01)
  *H04N 19/00* (2014.01)
  *H04N 19/124* (2014.01)
  *H04N 7/00* (2011.01)
  *H04N 19/146* (2014.01)

(52) U.S. Cl.
  CPC ......... *H04N 19/124* (2014.11); *H04N 19/142* (2014.11); *H04N 19/146* (2014.11); *H04N 19/172* (2014.11); *H04N 19/48* (2014.11)

(58) Field of Classification Search
  CPC .... H04N 19/159; H04N 19/172; H04N 19/48; H04N 19/87; H04N 7/00
  See application file for complete search history.

(56) References Cited

U.S. PATENT DOCUMENTS

| | | | |
|---|---|---|---|
| 8,165,202 B1 * | 4/2012 | Yonemoto | H04N 19/115 375/240.03 |
| 2001/0019588 A1 * | 9/2001 | Naito | H04N 19/61 375/240.24 |
| 2004/0252758 A1 | 12/2004 | Katsavounidis et al. | |
| 2005/0123044 A1 | 6/2005 | Katsavounidis et al. | |
| 2014/0198851 A1 * | 7/2014 | Zhao | H04N 7/15 375/240.16 |
| 2017/0208328 A1 * | 7/2017 | Kuusela | H04N 19/59 |
| 2018/0332281 A1 * | 11/2018 | Yu | H04N 19/91 |

FOREIGN PATENT DOCUMENTS

| | | |
|---|---|---|
| CN | 101677398 A | 3/2010 |
| CN | 102006471 A | 4/2011 |
| CN | 103826121 A | 5/2014 |
| CN | 106231305 A | 12/2016 |
| JP | 2000078588 A | 3/2000 |
| JP | 2004015351 A | 1/2004 |
| JP | 2005073245 A | 3/2005 |
| JP | 2011061534 A | 3/2011 |

OTHER PUBLICATIONS

Tencent Technology, IPRP, PCT/CN2018/095378, dated Feb. 18, 2020, 4 pgs.

Tencent Technology, ISR, PCT/CN2018/095378, dated Sep. 29, 2018, 4 pgs.

* cited by examiner

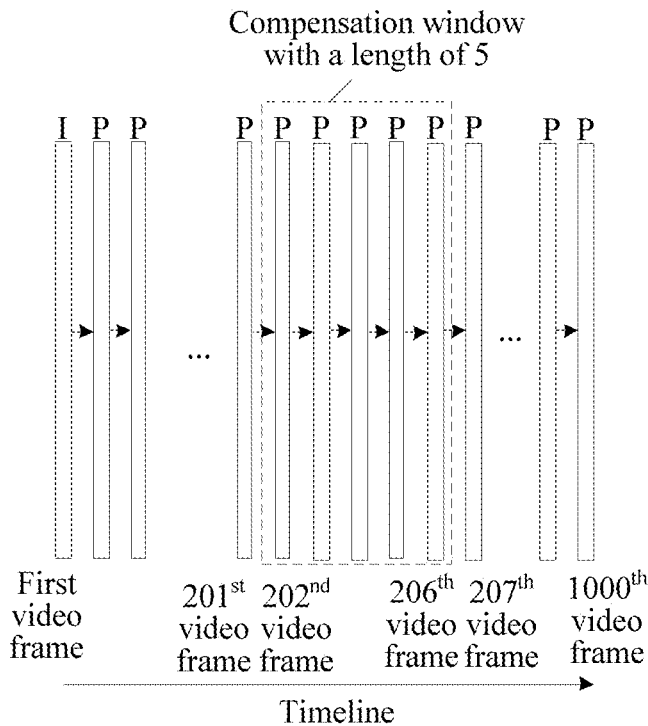

FIG. 4

Obtain an $i^{th}$ video frame in a group of pictures, perform video coding on the $i^{th}$ video frame by using a first coding rule, and count a quantity of actually consumed bits corresponding to the $i^{th}$ video frame after coding, i being greater than or equal to 1 and less than or equal to N, and N being a total quantity of video frames in the group of pictures — S101

Detect whether the $i^{th}$ video frame is in a scene change state based on the quantity of actually consumed bits, an initial average bit rate of the group of pictures, and a video frame detection rule — S102

Enter a video coding process of the $(i+1)^{th}$ video frame when the $i^{th}$ video frame is not in the scene change state, until coding of the $N^{th}$ video frame is finished — S106

FIG. 5

VIDEO FRAME CODING METHOD DURING SCENE CHANGE, TERMINAL AND STORAGE MEDIUM

CROSS-REFERENCE TO RELATED APPLICATIONS

This application is a continuation application of PCT/CN2018/095378, entitled "VIDEO FRAME CODING METHOD, TERMINAL AND STORAGE MEDIUM" filed on Jul. 12, 2018, which claims priority to China Patent Application No. 201710707503.6, filed with the Chinese Patent Office on Aug. 17, 2017 and entitled "VIDEO FRAME CODING METHOD AND TERMINAL", all of which are incorporated herein by reference in their entirety.

FIELD OF THE TECHNOLOGY

This application relates to video processing technologies in the field of multimedia, and in particular, to a video frame coding method, a terminal, and a storage medium.

BACKGROUND OF THE DISCLOSURE

Electronic technologies develop rapidly with the continuous development of science and technology. Electronic products become more diversified, and people also enjoy various conveniences brought by the development of science and technology. Nowadays, through various types of electronic devices or terminals and various functional applications installed on the terminals, people can enjoy a comfortable life brought by the development of science and technology. For example, a user can have a video chat with a friend at a remote place by using a social application on a terminal or shoot a video by using a camera application.

During a video chat using a social application on a terminal or the like, such phenomena as mobile phone shaking, shifting of a shooting scene, or switching of a camera for shooting occur occasionally. Therefore, a great change between content of a current frame and that of a previous frame, that is, scene change, occurs during video coding. Processing for video frames during scene change has always been a difficult problem, because a shooting scene change or video scene change causes a large quantity of bits to be generated in a video coding process, thereby causing large impact on a network and leading to a video pause. The quantity of bits consumed by the current video frame during scene change can be controlled by adjusting a coding parameter. However, due to the smaller quantity of bits consumed by the current video frame during scene change, coding quality thereof is relatively poor. There is still an obvious blocking effect before and after scene change, and a problem of an excessively high peak bit rate per second occurs easily.

SUMMARY

According to a first aspect of this application, an embodiment of this application provides a video frame coding method performed at a terminal having one or more processors and memory storing a plurality of programs to be executed by the one or more processors, the method comprising:

obtaining an $i^{th}$ video frame in a group of pictures, performing video coding on the $i^{th}$ video frame by using a first coding rule, and counting a quantity of actually consumed bits corresponding to the $i^{th}$ video frame after coding, i being greater than or equal to 1 and less than or equal to N, and N being a total quantity of video frames in the group of pictures;

detecting whether the $i^{th}$ video frame is in a scene change state based on the quantity of actually consumed bits, an initial average bit rate of the group of pictures, and a video frame detection rule;

determining a first initial quantization parameter, a first maximum quantization parameter, and a first minimum quantization parameter corresponding to a $(i+1)^{th}$ video frame based on the quantity of actually consumed bits, the initial average bit rate of the group of pictures and a quantization model when the $i^{th}$ video frame is in the scene change state;

obtaining a compensation length, and determining, based on the compensation length and the compensation model, first to-be-compensated video frames and first quantities of allocated bits for compensation corresponding to the first to-be-compensated video frames respectively; and updating the first coding rule according to a first quantity of allocated bits for compensation, the first initial quantization parameter, the first maximum quantization parameter, and the first minimum quantization parameter corresponding to the $(i+1)^{th}$ video frame when the $(i+1)^{th}$ video frame belongs to the first to-be-compensated video frames, and entering a video coding process of the $(i+1)^{th}$ video frame, until coding of an $N^{th}$ video frame is finished.

According to a second aspect of this application, an embodiment of this application provides a terminal comprising one or more processors and memory connected to the processors, the memory storing a plurality of machine readable instructions that, when executed by the processors, cause the terminal to perform the aforementioned message forwarding method.

According to a third aspect of this application, an embodiment of this application provides a non-transitory computer readable storage medium storing a plurality of instructions in connection with a terminal having one or more processors. The plurality of instructions, when executed by the processor, cause the terminal to perform the aforementioned message forwarding method.

BRIEF DESCRIPTION OF THE DRAWINGS

FIG. 4 is a second schematic structural diagram of an exemplary IPPP frame according to an embodiment of this application;

FIG. 5 is a second flowchart of a video frame coding method according to an embodiment of this application;

DESCRIPTION OF EMBODIMENTS

Technical solutions in the embodiments of this application will be described clearly and completely in the following with reference to the drawings in the embodiments of this application.

Figure 1:
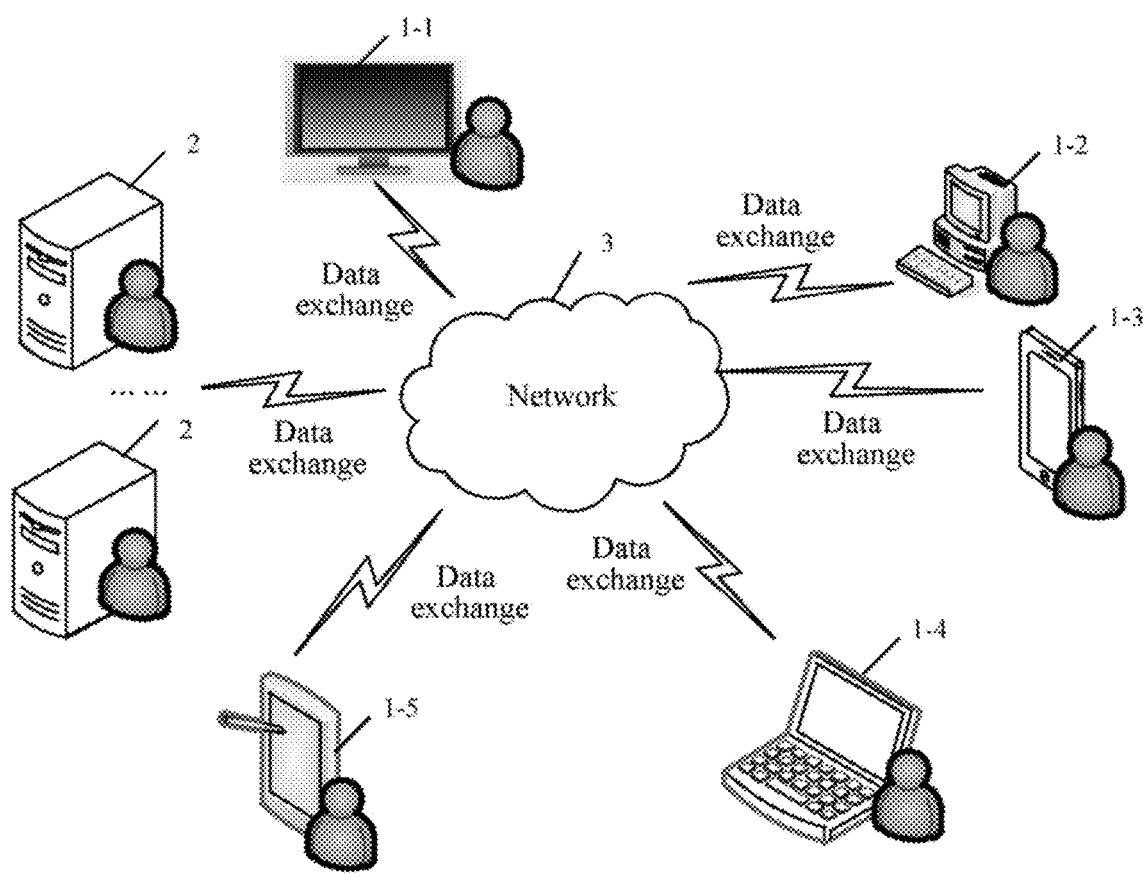
FIG. 1 is a schematic diagram of various hardware entities in a video frame coding system according to an embodiment of this application.

FIG. 1 is a schematic diagram of various hardware entities in a video frame coding system according to an embodiment of this application. A video frame coding method provided in the embodiments of this application is implemented based on the video frame coding system. FIG. 1 includes: one or more servers 2, terminals 1-1 to 1-5, and a network 3. The network 3 includes network entities such as a router and a gateway, which are not reflected in the figure. The terminals 1-1 to 1-5 perform information interaction with the server through a wired network or a wireless network, so that identification results are acquired from the terminals 1-1 to 1-5 and transmitted to the server. Shown in FIG. 1, types of the terminals include a mobile phone (the terminal 1-3), a tablet computer or a personal digital assistant (PDA) (the terminal 1-5), a desktop computer (the terminal 1-2), a PC (the terminal 1-4), an all-in-one machine (the terminal 1-1), and the like. Various applications required by users are installed in the terminals, for example, applications with an entertainment function (such as a video application, an audio playing application, a game application, a social application, and a reading application), or applications with service functions (such as a map navigation application, a group purchase application, a shooting application, a financial management application, and a communication application).

It should be noted that, use of the applications installed on the terminals requires data exchange with the server. The video frame coding method provided in the embodiments of this application may be implemented when a terminal performs video shooting or video communication by using an application.

A group of pictures (GOP) means a group of pictures corresponding to video frames in a video.

An I frame means an intra-predicted frame, which only uses intra-frame prediction.

A P frame means an inter-predicted frame, which only uses inter-frame prediction.

Quantization parameters (QPs) reflect a compression status of details of a video space.

An intra picture and predicted picture (IPPP) is a coding structure, and when a group of pictures is coded according to this frame structure, a current frame can only reference to a forward frame.

A peak bit rate per second means the largest bit rate consumed using a second as a unit.

Figure 2:
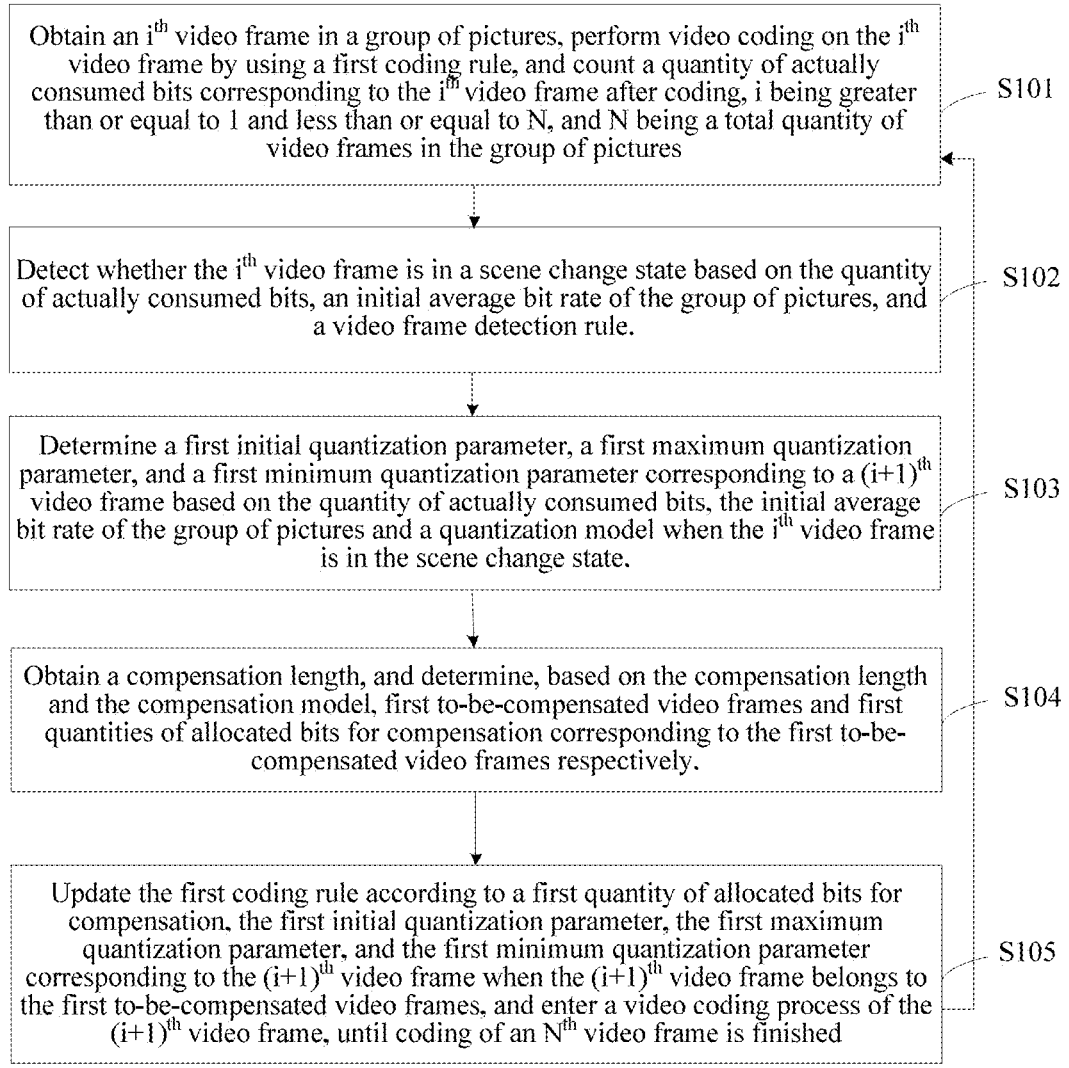
FIG. 2 is a first flowchart of a video frame coding method according to an embodiment of this application.

Based on the video frame coding system shown in FIG. 1, an embodiment of this application provides a video frame coding method, which is performed by the terminal 1 or the server with respect to each video frame in a group of pictures. Shown in FIG. 2, the method may include the following steps:

S101: Obtain an $i^{th}$ video frame in a group of pictures, perform video coding on the $i^{th}$ video frame by using a first coding rule, and count a quantity of actually consumed bits corresponding to the $i^{th}$ video frame after coding, i being greater than or equal to 1 and less than or equal to N, and N being a total quantity of video frames in the group of pictures.

The video frame coding method provided in this embodiment of this application is applied in a scenario of video frame coding when a terminal performs a video-related function such as video communication or video shooting by using an application, for example, a video conference scenario, a live broadcasting scenario, and a Voice over Internet Protocol (VoIP) network call scenario.

Figure 3:
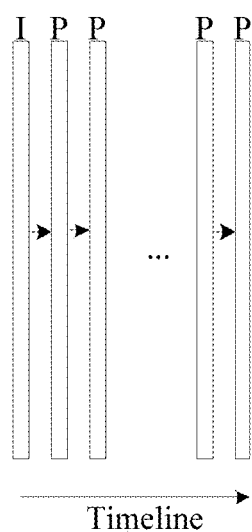
FIG. 3 is a first schematic structural diagram of an exemplary IPPP frame according to an embodiment of this application.

It should be noted that, in this embodiment of this application, video frames are formed by groups of pictures (GOP). Video frames in each group of pictures have an IPPP frame structure. Shown in FIG. 3, the IPPP frame structure may include I frames and P frames. In the video frame coding method provided in this embodiment of this application, coding is performed based on video frames in one group of pictures. Each group of pictures can be implemented according to the video frame coding method provided in this embodiment of this application, which is not limited in the embodiments of this application.

In this embodiment of this application, the terminal sequentially codes video frames in the group of pictures one by one. A total quantity of video frames in the group of pictures is set to N, N being a positive integer greater than 1. In this way, the terminal obtains an $i^{th}$ video frame in the group of pictures and starts coding the $i^{th}$ video frame. Specifically, the terminal performs video coding on the $i^{th}$ video frame by using a first coding rule, and counts a quantity of bits consumed by coding of the $i^{th}$ video frame after the coding, to obtain a quantity of actually consumed bits corresponding to the $i^{th}$ video frame after coding, i being greater than or equal to 1 and less than or equal to N.

It should be noted that, in this embodiment of this application, the $i^{th}$ frame processed by the terminal may be a video frame that does not need to be compensated, or a video frame that needs to be compensated. Specifically, whether the $i^{th}$ frame needs to be compensated is determined based on a frame coding process prior to the $i^{th}$ frame. Therefore, when obtaining the $i^{th}$ video frame, the terminal codes the $i^{th}$ video frame by using the first coding rule herein. A specific processing procedure will be described in detail in the subsequent embodiments.

In this embodiment of this application, the first coding rule is a rule for coding the $i^{th}$ video frame. For specific implementation, a detailed process is described in Embodiment 2. The first coding rule may be a coding rule customized by a user in advance, or a coding rule obtained after the terminal performs real-time adjustment in the coding process. Specific implementations are not limited in the embodiments of this application.

S102: Detect whether the $i^{th}$ video frame is in a scene change state based on the quantity of actually consumed bits, an initial average bit rate of the group of pictures, and a video frame detection rule.

After obtaining the quantity of actually consumed bits corresponding to the $i^{th}$ video frame after coding, the terminal may detect whether the $i^{th}$ video frame is in a scene change state based on the quantity of actually consumed bits, an initial average bit rate of the group of pictures, and a video frame detection rule. In other words, the terminal may determine whether the $i^{th}$ frame is a scene change frame based on the quantity of actually consumed bits, the initial average bit rate of the group of pictures, and the video frame detection rule.

In this embodiment of this application, the initial average bit rate of the group of pictures may be an initial average bit rate of the group of pictures which is set at the beginning of coding, or a dynamic initial average bit rate of the group of pictures which is obtained in real time at the beginning of coding, and a specific implementation form is not limited in the embodiments of this application. The video frame detection rule may be a detection rule customized by the user in advance, or a detection rule obtained after the terminal performs real-time adjustment in the coding process, and a specific implementation form is not limited in the embodiments of this application.

Herein, the video frame detection rule is a condition for determining whether a currently detected video frame (that is, the i$^{th}$ video frame) is a scene change frame (whether the frame is in the scene change state).

It should be noted that, in this embodiment of this application, due to different frame types of the i$^{th}$ video frame, the terminal detects whether the i$^{th}$ video frame is in the scene change state in different manners.

Herein, because video frames are of different frame types in this embodiment of this application, when detecting the i$^{th}$ video frame, the terminal uses a first video frame detection rule to process a P frame, and uses a second video frame detection rule to process an I frame. In other words, the video frame detection rule includes the first video frame detection rule and the second video frame detection rule. Therefore, the process of detecting whether the i$^{th}$ video frame is in the scene change state based on the quantity of actually consumed bits, the initial average bit rate of the group of pictures, and the video frame detection rule includes S1021-S1023 as follows:

S1021. Detect a first frame type of the i$^{th}$ video frame.

S1022: Obtain a remaining average bit rate of the group of pictures when the first frame type is a target frame type, and detect whether the i$^{th}$ video frame is in the scene change state according to the quantity of actually consumed bits, the initial average bit rate of the group of pictures, the remaining average bit rate of the group of pictures, and the first video frame detection rule.

In some embodiments, the remaining average bit rate of the group of pictures is a quotient of a quantity of remaining bits in the group of pictures divided by a quantity of remaining frames in the group of pictures when coding proceeds to the i$^{th}$ video frame. Specifically, before coding of the group of pictures, a particular quantity of bits is allocated to the group of pictures, and then coding of the video frames in the group of pictures is started. When coding proceeds to the i$^{th}$ video frame, the quantity of remaining bits of the group of pictures is the quantity of initially allocated bits minus the quantity of bits consumed by the previous (i−1) video frames. The remaining average bit rate of the group of pictures is the quantity of remaining bits of the group of pictures divided by the quantity of remaining frames including the i$^{th}$ frame.

S1023: Detect whether the i$^{th}$ video frame is in the scene change state according to the quantity of actually consumed bits, the initial average bit rate of the group of pictures, and the second video frame detection rule when the first frame type is not the target frame type.

In this embodiment of this application, the target frame type is a P frame. When the first frame type is the target frame type, it indicates that the i$^{th}$ video frame is a P frame; when the first frame type is not the target frame type, it indicates that the i$^{th}$ video frame is an I frame.

In this embodiment of this application, the first video frame detection rule is a condition or rule for detecting whether an i$^{th}$ video frame, which is a P frame, is in the scene change state, and the first video frame detection rule may be any one of the following inequalities (1) and (2):

$$R_{actual} > \gamma \times R_{ave} \, \& \, R_{actual} > \beta \times R_{ave\_remain} \quad (1)$$

$$\alpha \times R_{ave} < R_{actual} \leq \gamma \times R_{ave} \, \& \, R_{actual} > \beta \times R_{ave\_remain} \quad (2)$$

$R_{actual}$ is the quantity of actually consumed bits, $R_{ave}$ is the initial average bit rate of the group of pictures, and $R_{ave\_remain}$ is the remaining average bit rate of the group of pictures. The principle of the first video frame detection rule is illustrated by using $R_{actual} > \beta \times R_{ave\_remain}$ as an example. When $R_{actual} > \beta \times R_{ave\_remain}$, it indicates that the quantity of actually bits $R_{actual}$ of the i$^{th}$ video frame exceeds the remaining average bit rate of the group of pictures by a specific ratio β, that is, the i$^{th}$ video frame consumes an excessively high bit rate. Therefore, it can be determined that the i$^{th}$ video frame is in the scene change state, and bit compensation needs to be performed on video frames in a compensation window after the i$^{th}$ video frame.

It should be noted that, α, β, and γ in the foregoing inequalities are empirical values, and may be set to 1.5, 1.7, and 2.1 respectively in experiments in some embodiments.

In this embodiment of this application, the second video frame detection rule is a condition or rule for detecting whether an i$^{th}$ video frame, which is an I frame, is in the scene change state, and the second video frame detection rule may be any one of the following inequalities (3), (4), and (5):

$$R_{ave} < R_{actual} \leq \omega_1 \times R_{ave} \quad (3)$$

$$\omega_1 \times R_{ave} < R_{actual} \leq \omega_2 \times R_{ave} \quad (4)$$

$$\omega_2 \times R_{ave} < R_{actual} \leq \omega_3 \times R_{ave} \quad (5)$$

$R_{actual}$ is the quantity of actually consumed bits, and $R_{ave}$ is the initial average bit rate of the group of pictures.

It should be noted that, In some embodiments, $\omega_1$, $\omega_2$ and $\omega_3$ in the foregoing inequalities may be set to 2, 3, and 4 respectively.

Herein, in this embodiment of this application, when the first frame type is the target frame type, if the terminal detects that the quantity of actually consumed bits, the initial average bit rate of the group of pictures, and the remaining average bit rate of the group of pictures meet the first video frame detection rule, it indicates that the i$^{th}$ video frame is in the scene change state; otherwise, it indicates that the i$^{th}$ video frame is not in the scene change state. When the first frame type is not the target frame type, if the terminal detects that the quantity of actually consumed bits and the initial average bit rate of the group of pictures meet the second video frame detection rule, it indicates that the i$^{th}$ video frame is in the scene change state; otherwise, it indicates that the i$^{th}$ video frame is not in the scene change state.

It should be noted that, in the video frame coding method provided in this embodiment of this application, S1022 and S1023 are two optional processes after S1021, and the terminal in this embodiment of this application may perform S1021 to S1022 or S1021 to S1023 according to an actual running status, which is not limited in the embodiments of this application.

S103: Determine a first initial quantization parameter, a first maximum quantization parameter, and a first minimum quantization parameter corresponding to a (i+1)$^{th}$ video frame based on the quantity of actually consumed bits, the initial average bit rate of the group of pictures and a quantization model when the i$^{th}$ video frame is in the scene change state.

In this embodiment of this application, when coding video frames in a current group of pictures, the terminal may obtain an initial average bit rate of the current group of pictures, that is, the initial average bit rate of the group of pictures. In this way, after detecting whether the i$^{th}$ video frame is in the scene change state, the terminal may determine a first initial quantization parameter, a first maximum quantization parameter, and a first minimum quantization parameter corresponding to an (i+1)$^{th}$ video frame based on the quantity of actually consumed bits, the initial average bit rate of the group of pictures, and a quantization model when the i$^{th}$ video frame is in the scene change state.

In this embodiment of this application, the quantization model is a model for calculating a quantization parameter of the $i^{th}$ video frame. The quantization model may be a model customized by the user in advance for quantization, or a model for quantization which is obtained after the terminal performs real-time adjustment in the coding process, and a specific implementation form is not limited in the embodiments of this application.

It should be noted that, In this embodiment of this application, after finishing coding the $i^{th}$ video frame, the terminal may calculate and adjust parameters related to coding of the $(i+1)^{th}$ video frame by using related coding parameters corresponding to the $i^{th}$ video frame.

In this embodiment of this application, because video frames in the group of pictures processed by the terminal can be classified into two types: I frames and P frames, there are two possible types for the $i^{th}$ video frame. The process of determining, by the terminal, the first initial quantization parameter, the first maximum quantization parameter, and the first minimum quantization parameter corresponding to the $(i+1)^{th}$ video frame based on the quantity of actually consumed bits, the initial average bit rate of the group of pictures, and the quantization model may be completed using different implementation solutions depending on different types of the $i^{th}$ video frame.

When the $i^{th}$ video frame is a P frame, the terminal may further obtain a remaining average bit rate of the group of pictures. Therefore, the terminal determines the first initial quantization parameter, the first maximum quantization parameter, and the first minimum quantization parameter corresponding to the $(i+1)^{th}$ video frame according to the remaining average bit rate of the group of pictures, the total quantity of actually consumed bits, the initial average bit rate of the group of pictures, and a first quantization model. The quantization model includes the first quantization model and a second quantization model.

In this embodiment of this application, the first quantization model may be divided into a first initial quantization model, a first maximum quantization model, and a first minimum quantization model. The terminal may determine the first initial quantization parameter according to the remaining average bit rate of the group of pictures, the quantity of actually consumed bits, the initial average bit rate of the group of pictures, and the first initial quantization model. The terminal may determine the first maximum quantization parameter according to the remaining average bit rate of the group of pictures, the quantity of actually consumed bits, the initial average bit rate of the group of pictures, and the first maximum quantization model. The terminal may determine the first minimum quantization parameter according to the remaining average bit rate of the group of pictures, the quantity of actually consumed bits, the initial average bit rate of the group of pictures, and the first minimum quantization model.

For example, the first maximum quantization model may be shown in formula (6). Formula (6) is as follows:

$$QP_{max} = \begin{cases} QP_{aveP} + \Delta_1 & R_{actual} > \gamma \times R_{ave} \; \& R_{actual} > \beta \times R_{ave\_remain} \\ QP_{aveP} + \Delta_2 & \alpha \times R_{ave} < R_{actual} \leq \gamma \times R_{ave} \; \& R_{actual} > \beta \times R_{ave\_remain} \\ QP_{aveP} + \Delta_3 & \text{otherwise} \end{cases} \quad (6)$$

$QP_{max}$ is the first maximum quantization parameter, $QP_{aveP}$ is the preset average quantization parameter, $R_{actual}$ is the quantity of actually consumed bits, $R_{ave}$ is the initial average bit rate of the group of pictures, and $R_{ave\_remain}$ is the remaining average bit rate of the group of pictures.

It should be noted that, $\alpha$, $\beta$, and $\gamma$ in the foregoing formula are empirical values, and may be set to 1.5, 1.7, and 2.1 respectively in experiments in some embodiments. $\Delta_1$, $\Delta_2$ and $\Delta_3$ in the foregoing formula are deviation values of QP in different step functions of $QP_{max}$, and are set to 3, 2, and 1 respectively in experiments. The deviation value increases as the quantity of actually consumed bits $R_{actual}$ exceeds the preset initial average bit rate $R_{ave}$ by a greater extent.

For example, the first minimum quantization model may be shown in formula (7). Formula (7) is as follows:

$$QP_{min} = \begin{cases} QP_{aveP} + \Delta_4 & R_{actual} > \gamma \times R_{ave} \; \& R_{actual} > \beta \times R_{ave\_remain} \\ QP_{aveP} + \Delta_5 & \alpha \times R_{ave} < R_{actual} \leq \gamma \times R_{ave} \; \& R_{actual} > \beta \times R_{ave\_remain} \\ QP_{aveP} + \Delta_6 & \text{otherwise} \end{cases} \quad (7)$$

$QP_{min}$ is the first maximum quantization parameter, $QP_{aveP}$ is the preset average quantization parameter, $R_{actual}$ is the quantity of actually consumed bits, $R_{ave}$ is the initial average bit rate of the group of pictures, and $R_{ave\_remain}$ is the remaining average bit rate of the group of pictures.

It should be noted that, $\alpha$, $\beta$, and $\gamma$ in the foregoing formula are empirical values, and may be set to 1.5, 1.7, and 2.1 respectively in experiments in some embodiments. $\Delta_4$, $\Delta_5$, and $\Delta_6$ in the foregoing formula are deviation values of QP in different step functions of $QP_{min}$, and are set to 1, 0, and −1 respectively in experiments. The deviation value increases as the quantity of actually consumed bits $R_{actual}$ exceeds the preset initial average bit rate $R_{ave}$ by a greater extent.

For example, the first initial quantization model may be shown in formula (8). The formula (8) is as follows:

$$QP_{frame} = \begin{cases} QP_{aveP} + \Delta_7 & R_{actual} > \gamma \times R_{ave} \; \& R_{actual} > \beta \times R_{ave\_remain} \\ QP_{aveP} + \Delta_8 & \alpha \times R_{ave} < R_{actual} \leq \gamma \times R_{ave} \; \& R_{actual} > \beta \times R_{ave\_remain} \\ QP_{aveP} + \Delta_9 & \text{otherwise} \end{cases} \quad (8)$$

$QP_{frame}$ is the first maximum quantization parameter, $QP_{aveP}$ is the preset average quantization parameter, $R_{actual}$ is the quantity of actually consumed bits, $R_{ave}$ is the initial average bit rate of the group of pictures, and $R_{ave\_remain}$ is the remaining average bit rate of the group of pictures.

It should be noted that, $\alpha$, $\beta$, and $\gamma$ in the foregoing formula are empirical values, and may be set to 1.5, 1.7, and 2.1 respectively in experiments in some embodiments. $\Delta_7$, $\Delta_8$, and $\Delta_9$ in the foregoing formula are deviation values of QP in different step functions of $QP_{frame}$, and are set to 2, 1, and 0 respectively in experiments. The deviation value increases as the quantity of actually consumed bits $R_{actual}$ exceeds the preset initial average bit rate $R_{ave}$ by a greater extent.

Further, in this embodiment of this application, after obtaining the first initial quantization parameter, the first maximum quantization parameter, and the first minimum quantization parameter, the terminal adjusts the first initial quantization parameter, the first maximum quantization parameter, and the first minimum quantization parameter according to a quantization adjustment model to obtain a first adjustment initial quantization parameter, a first adjustment maximum quantization parameter, and a first adjustment minimum quantization parameter, when the quantity of actually consumed bits and a target bit quantity meet a ratio condition. The target bit quantity is a quantity of bits pre-allocated for the $i^{th}$ video frame.

In this embodiment of this application, the quantization adjustment model is a model for adjusting the quantization parameters calculated from the $i^{th}$ video frame. The quantization adjustment model may be a model customized by the user in advance for quantization adjustment, or a model for quantization adjustment which is obtained after the terminal performs real-time adjustment in the coding process, and a specific implementation form is not limited in the embodiments of this application.

For example, the quantization adjustment model may be shown in formula (9-1), formula (9-2), and formula (9-3). Formula (9-1), formula (9-2), and formula (9-3) are specifically as follows:

$$QP'_{max} = \begin{cases} QP_{max} + \Delta''_{QPI} & R_{actual} > \tau \times R_{target} \\ QP_{max} + \Delta'_{QPI} & \sigma \times R_{target} < R_{actual} \leq \tau \times R_{target} \\ QP_{max} & \text{otherwise} \end{cases} \quad (9\text{-}1)$$

$$QP'_{min} = \begin{cases} QP_{min} + \Delta''_{QPI} & R_{actual} > \tau \times R_{target} \\ QP_{min} + \Delta'_{QPI} & \sigma \times R_{target} < R_{actual} \leq \tau \times R_{target} \\ QP_{min} & \text{otherwise} \end{cases} \quad (9\text{-}2)$$

$$QP'_{frame} = \begin{cases} QP_{frame} + \Delta''_{QPI} & R_{actual} > \tau \times R_{target} \\ QP_{frame} + \Delta'_{QPI} & \sigma \times R_{target} < R_{actual} \leq \tau \times R_{target} \\ QP_{frame} & \text{otherwise} \end{cases} \quad (9\text{-}3)$$

$QP_{max}'$ is the first adjustment maximum quantization parameter, $QP_{max}$ is the first maximum quantization parameter, $QP_{min}'$ is the first adjustment minimum quantization parameter, $QP_{min}$ is the first minimum quantization parameter, $QP_{frame}'$ is the first adjustment initial quantization parameter, $QP_{frame}$ is the first initial quantization parameter, $R_{target}$ is a preset target bit quantity of the $i^{th}$ frame, and $R_{actual}$ is the quantity of actually consumed bits of the $i^{th}$ frame.

It should be noted that, $\sigma$ and $\tau$ in the foregoing formula are 1.7 and 2.5 respectively in experiments. $\Delta'_{QPI}$ and $\Delta''_{QPI}$ in the foregoing formula are deviation values in different step functions, and are set to 1 and 2 respectively in experiments in some embodiments.

Specifically, when the $i^{th}$ video frame is an I frame, the terminal determines the first initial quantization parameter, the first maximum quantization parameter, and the first minimum quantization parameter corresponding to the (i+1)$^{th}$ video frame according to the total quantity of actually consumed bits, the initial average bit rate of the group of pictures, and the second quantization model.

In this embodiment of this application, the second quantization model may be divided into a second initial quantization model, a second maximum quantization model, and a second minimum quantization model. The terminal may determine the first initial quantization parameter according to the quantity of actually consumed bits, the initial average bit rate of the group of pictures, and the second initial quantization model. The terminal may determine the first maximum quantization parameter according to the quantity of actually consumed bits, the initial average bit rate of the group of pictures, and the second maximum quantization model. The terminal may determine the first minimum quantization parameter according to the quantity of actually consumed bits, the initial average bit rate of the group of pictures, and the second minimum quantization model.

For example, the second maximum quantization model may be shown in formula (10). Formula (10) is shown as follows:

$$QP_{max} = \begin{cases} QP_{aveP} + \Delta_1 & R_{ave} < R_{actual} \leq \omega_1 \times R_{ave} \\ QP_{aveP} + \Delta_2 & \omega_1 \times R_{ave} < R_{actual} \leq \omega_2 \times R_{ave} \\ QP_{aveP} + \Delta_3 & \omega_2 \times R_{ave} < R_{actual} \leq \omega_3 \times R_{ave} \end{cases} \quad (10)$$

$QP_{max}$ is the first maximum quantization parameter, $QP_{aveP}$ is the preset average quantization parameter, $R_{actual}$ is the quantity of actually consumed bits, and $R_{ave}$ is the initial average bit rate of the group of pictures.

It should be noted that, in some embodiments, $\omega_1$, $\omega_2$ and $\omega_3$ in the foregoing formula may be set to 2, 3 and 4 respectively. $\Delta_1$, $\Delta_2$, and $\Delta_3$ in the foregoing formula are deviation values of QP in different step functions of $QP_{max}$, and are set to 3, 5, and 7 respectively in experiments. The deviation value increases as the quantity of actually consumed bits $R_{actual}$ exceeds the preset initial average bit rate $R_{ave}$ by a greater extent.

For example, the second minimum quantization model may be shown in formula (11). Formula (11) is shown as follows:

$$QP_{min} = \begin{cases} QP_{aveP} + \Delta_4 & R_{ave} < R_{actual} \leq \omega_1 \times R_{ave} \\ QP_{aveP} + \Delta_5 & \omega_1 \times R_{ave} < R_{actual} \leq \omega_2 \times R_{ave} \\ QP_{aveP} + \Delta_6 & \omega_2 \times R_{ave} < R_{actual} \leq \omega_3 \times R_{ave} \end{cases} \quad (11)$$

$QP_{min}$ is the first maximum quantization parameter, $QP_{aveP}$ is the preset average quantization parameter, $R_{actual}$ is the quantity of actually consumed bits, and $R_{ave}$ is the initial average bit rate of the group of pictures.

It should be noted that, in some embodiments, $\omega_1$, $\omega_2$ and $\omega_3$ in the foregoing formula may be set to 2, 3 and 4 respectively. $\Delta_4$, $\Delta_5$, and $\Delta_6$ in the foregoing formula are deviation values of QP in different step functions of $QP_{min}$, and are set to 1, 3, and 5 respectively in experiments. The deviation value increases as the quantity of actually consumed bits $R_{actual}$ exceeds the preset initial average bit rate $R_{ave}$ by a greater extent.

For example, the second initial quantization model may be shown in formula (12). Formula (12) is shown as follows:

$$QP_{frame} = \begin{cases} QP_{aveP} + \Delta_7 & R_{ave} < R_{actual} \leq \omega_1 \times R_{ave} \\ QP_{aveP} + \Delta_8 & \omega_1 \times R_{ave} < R_{actual} \leq \omega_2 \times R_{ave} \\ QP_{aveP} + \Delta_9 & \omega_2 \times R_{ave} < R_{actual} \leq \omega_3 \times R_{ave} \end{cases} \quad (12)$$

$QP_{frame}$ is the first maximum quantization parameter, $QP_{aveP}$ is the preset average quantization parameter, $R_{actual}$ is the quantity of actually consumed bits, and $R_{ave}$ is the initial average bit rate of the group of pictures.

It should be noted that, In some embodiments, $\omega_1$, $\omega_2$ and $\omega_3$ in the foregoing formula may be set to 2, 3 and 4 respectively. $\Delta_7$, $\Delta_8$, and $\Delta_9$ in the foregoing formula are deviation values of QP in different step functions of $QP_{frame}$, and are set to 2, 4, and 6 respectively in experiments. The deviation value increases as the quantity of actually consumed bits $R_{actual}$ exceeds the preset initial average bit rate $R_{ave}$ by a greater extent.

S104: Obtain a compensation length, and determine, based on the compensation length and the compensation model, first to-be-compensated video frames and first quantities of allocated bits for compensation corresponding to the first to-be-compensated video frames respectively.

In some embodiments, after the terminal detects a scene state of the $i^{th}$ video frame, if it is detected that the $i^{th}$ video frame is in the scene change state, the terminal further needs to establish a compensation window, obtain a compensation length, determine first to-be-compensated video frames according to the compensation length, and then determine, based on the compensation model, first quantities of allocated bits for compensation corresponding to the first to-be-compensated video frames respectively. The quantity of the first to-be-compensated video frames is equal to the compensation length.

In this embodiment of this application, the compensation model is a model for calculating a compensation length of the coded $i^{th}$ video frame in a scene change scenario. The compensation model may be a model customized by the user in advance for compensation, or a model for compensation which is obtained after the terminal performs real-time adjustment in the coding process, and a specific implementation form is not limited in the embodiments of this application.

It should be noted that, in this embodiment of this application, the current video frame (that is, the $i^{th}$ video frame) is detected after coding. If it is determined that the current video frame is a video frame during scene change, a compensation window is established after the current video frame is coded, and target bits of corresponding video frames in the compensation window are re-allocated, that is, quantities of bits required for coding the video frames after the current video frame are adjusted or coding parameters (such as a bit rate control parameter and a quantization parameter) of video frames after the current video frame are adjusted, so that quantities of bits consumed by the video frames after the current video frame are controlled in the coding process, thereby achieving a good overall effect of video frame coding.

In this embodiment of this application, the compensation window represents a length of video frames after the video frame in the scene change state that require bit compensation, and the video frames in the compensation window may be referred to as to-be-compensated video frames. The length of the compensation window herein may be referred to as a compensation length.

In this embodiment of this application, the process of detecting that the $i^{th}$ video frame is in the scene change state, establishing the compensation window, and obtaining the compensation length by the terminal is also related to the frame type of the $i^{th}$ video frame. When the terminal detects that the $i^{th}$ video frame is a P frame in the scene change state, the terminal may obtain the compensation length according to a first compensation length model. When the terminal detects that the $i^{th}$ video frame is an I frame in the scene change state, the terminal may obtain the compensation length according to a second compensation length model.

For example, when the terminal detects that the $i^{th}$ video frame is a P frame in the scene change state, the first compensation length model may be shown in formula (13) and formula (14). Formula (13) and formula (14) are shown as follows:

$$L' = \begin{cases} L_1 & R_{actual} > \gamma \times R_{ave} \ \& R_{actual} > \beta \times R_{ave\_remain} \\ L_2 & \alpha \times R_{ave} < R_{actual} \leq \gamma \times R_{ave} \ \& R_{actual} > \beta \times R_{ave\_remain} \end{cases} \quad (13)$$

$$L = \min(L', N_P) \quad (14)$$

$R_{actual}$ is the quantity of actually consumed bits, $R_{ave}$ is the initial average bit rate of the group of pictures, $R_{ave\_remain}$ is the remaining average bit rate of the group of pictures, L' is an intermediate compensation length, L is the compensation length (the length of the compensation window), and $L_1$, $L_2$ are preset compensation window lengths. $N_P$ represents a quantity of remaining P frames to be coded in the group of pictures.

It should be noted that, $\alpha$, $\beta$, and $\gamma$ in the foregoing formula are empirical values, and may be set to 1.5, 1.7, and 2.1 respectively in experiments in some embodiments. $L_1$ and $L_2$ above may be set to 5 and 2 respectively in experiments.

In this embodiment of this application, the physical meaning of the foregoing formulas is that when the quantity of actually consumed bits $R_{actual}$ exceeds the remaining average bit rate $R_{ave\_remain}$ of the group of pictures by a particular ratio of $\beta$, the size of the compensation window L' is determined according to a ratio of quantity of actually consumed bits $R_{actual}$ of the $i^{th}$ video frame and the initial average bit rate $R_{ave}$ of the group of pictures. A greater ratio indicates that more bits are needed for compensation, and therefore a longer compensation window, that is, a greater compensation length, is needed.

In this embodiment of this application, formula (14) represents that the maximum value of the compensation length is the quantity of remaining P frames to be coded in the group of pictures. Because the terminal is currently performing video coding on the video frames in the group of pictures, the compensation length obtained by the terminal is also used for compensation of the video frames to be coded in the group of pictures. Therefore, the maximum value of the compensation length should not be greater than $N_P$.

For example, when the terminal detects that the $i^{th}$ video frame is an I frame in the scene change state, the first compensation length model may be shown in formula (15), formula (16), and formula (17). Formula (15), formula (16), and formula (17) are shown as follows:

$$L = \begin{cases} L_1 & R_{ave} < R_{actual} \leq \omega_1 \times R_{ave} \\ \max(L_2, L_{N\_I}) & \omega_1 \times R_{ave} < R_{actual} \leq \omega_2 \times R_{ave} \\ \max(L_3, L_{N\_I}) & \omega_2 \times R_{ave} < R_{actual} \leq \omega_3 \times R_{ave} \end{cases} \quad (15)$$

$$L_{N\_I} = \min(\rho_1 \times fps, \rho_2 \times L_{GOP\_P}) \quad (16)$$

$$L_{N\_I} = \min(L_{N\_I}, \zeta) \quad (17)$$

L is the compensation length (the length of the compensation window); $R_{actual}$ is the quantity of actually consumed bits; $R_{ave}$ is the initial average bit rate of the group of pictures; fps represents a frame rate; $L_{GOP\_P}$ represents a quantity of P frames in the group of pictures; $\rho_1$ and $\rho_2$ respectively represent additional weights of the frame rate and the P frame quantity when used for determining the length of the compensation window, and may be set to 0.4 and 0.8 in experiments. $L_{N\_I}$ is a compensation window length estimated according to fps and $L_{GOP\_P}$, and is used as a reference for setting the size of the compensation window subsequently. The maximum value of the compensation window is set to ζ, and is set to 15 in experiments 15. $\omega_1$, $\omega_2$, and $\omega_3$ are 2, 3, and 4 respectively. $L_1$, $L_2$, and $L_3$ are minimum values of L in different stages, and are set to 1, 2, and 5 respectively in experiments. Formula (15) is used for further adjusting the compensation window according to the quantity of actually consumed bits $R_{actual}$ and the average quantity of bits $R_{ave}$.

It should be noted that, in this embodiment of this application, no matter whether the $i^{th}$ video frame in the scene change state is an I frame or a P frame, after the terminal obtains the compensation length, L successive video frames after the $i^{th}$ video frame are the first to-be-compensated video frames. Moreover, after the terminal obtains the compensation length, the first quantities of allocated bits for compensation corresponding to the first to-be-compensated video frame respectively are all determined based on the compensation length and the compensation model.

For example, as shown in FIG. 4, it is assumed that the current group of pictures includes 1000 video frames, and when coding the $201^{st}$ video frame, the terminal detects that the $201^{st}$ video frame is in the scene change state, that is, the $201^{st}$ video frame needs to consume an excessively high bit rate, and bit compensation needs to be performed for video frames in a compensation window after the $201^{st}$ video frame. It is assumed that a calculated compensation length is 5, that is, the length of the compensation window after the $201^{st}$ video frame is 5. The $201^{st}$ video frame being a P frame is used as an example for description, and 5 successive video frames (that is, the $202^{nd}$ video frame to the $206^{th}$ video frame) after the $201^{st}$ video frame are the first to-be-compensated video frames that require bit compensation in the compensation window.

Herein, the terminal may obtain first compensation bit bases corresponding to the first to-be-compensated video frames respectively according to the compensation length, the quantity of actually consumed bits, the initial average bit rate of the group of pictures, and a preset compensation base model, and then obtain the first quantities of allocated bits for compensation corresponding to the first to-be-compensated video frames respectively according to the first compensation bit base, the initial average bit rate of the group of pictures, the remaining average bit rate of the group of pictures, and a preset bit allocation model for compensation. The compensation model may include the preset compensation base model and the preset bit allocation model for compensation.

For example, the preset compensation base model in this embodiment of this application may be shown in formula (18). Formula (18) may be as follows:

$$R_{com\_j} = \frac{R_{actual} - R_{ave}}{\sum_{j=1}^{L} \mu_j} \qquad (18)$$

$R_{com\_j}$ is a first compensation bit base corresponding to a $(i+j)^{th}$ video frame, $R_{actual}$ is the quantity of actually consumed bits, $R_{ave}$ is the initial average bit rate of the group of pictures, and $\mu_j$ is a weight of each first to-be-compensated video frame in the compensation window.

It should be noted that, In this embodiment of this application, $\mu_j$ is set based on the following principle: a first to-be-compensated video frame closer to the ith video frame corresponds to a greater weight $\mu_j$.

In this embodiment of this application, the compensation model is used for representing calculating, according to a difference by which the quantity of actually consumed bits of the ith video frame exceeds the initial average bit rate of the group of pictures during scene change, a weighted average quantity of bits $R_{com\_j}$ required for compensation of each first to-be-compensated video frame in the compensation window.

For example, the preset bit allocation model for compensation in this embodiment of this application may be shown in formula (19). Formula (19) may be shown as follows:

$$R_{T\_j} = \begin{cases} R_{ave} - \mu_j * R_{com\_j} & j = 1 \ldots L \\ R_{ave\_remain} & \end{cases} \qquad (19)$$

$R_{T\_j}$ is a first quantity of allocated bits for compensation corresponding to the (i+j)th video frame, $R_{com\_j}$ is a first compensation bit base corresponding to the (i+j)th video frame, $R_{ave}$ is the initial average bit rate of the group of pictures, and $R_{ave\_remain}$ is the remaining average bit rate of the group of pictures.

It should be noted that, if the current video frame that needs to be coded is in the compensation window, the preset quantity of bits allocated by the terminal is the initial average bits rate $R_{ave}$ of the group of pictures minus a product between the first compensation bit base corresponding to the current video frame and the corresponding weight. That is, the target bit quantity is calculated based on the first quantity of allocated bits for compensation. If the current video frame is not in the compensation window, the target bit quantity allocated by the terminal is the average bit rate $R_{ave\_remain}$ of the remaining bits of the group of pictures.

It can be understood that, in this embodiment of this application, when the ith video frame is in the scene change state, the terminal smoothly distributes the quantity of extra bits consumed during coding of the ith video frame to a plurality of subsequent frames (that is, the first to-be-compensated video frames), so as to achieve an effect of smoothing the bit rate as much as possible without decreasing the subjective quality of the whole video.

It should be noted that, in this embodiment of this application, S103 and S104 are both processes performed by the terminal when the ith video frame is in the scene change state, a sequence of performing S103 and S104 after S102 is not limited in the embodiments of this application. That is, the terminal may perform S102-103-104, or perform S102-104-103.

S105: Update the first coding rule according to a first quantity of allocated bits for compensation, the first initial quantization parameter, the first maximum quantization parameter, and the first minimum quantization parameter corresponding to the (i+1)th video frame when the (i+1)th video frame belongs to the first to-be-compensated video frames, and enter a video coding process of the (i+1)th video frame, until coding of an Nth video frame is finished.

In some embodiments, after obtaining the first quantity of allocated bits for compensation, the first initial quantization parameter, the first maximum quantization parameter, and the first minimum quantization parameter, the terminal may code the (i+1)th video frame according to the first quantity of allocated bits for compensation, the first initial quantization parameter, the first maximum quantization parameter, and the first minimum quantization parameter. That is, the terminal may update the first coding rule according to the first quantity of allocated bits for compensation, the first initial quantization parameter, the first maximum quantization parameter, and the first minimum quantization parameter, and then enter the video coding process of the (i+1)th video frame to start coding the (i+1)th video frame and perform processing after the coding, until coding of an Nth video frame is finished.

In some embodiments, the first coding rule is determined according to the first quantity of allocated bits for compensation, the first initial quantization parameter, the first maximum quantization parameter, and the first minimum quantization parameter, and the first coding rule may be updated according to the obtained first quantity of allocated bits for compensation, first initial quantization parameter, first maximum quantization parameter, and first minimum quantization parameter.

In some embodiments, before video coding of the (i+1)th video frame is started, it is necessary to determine whether the (i+1)th video frame belongs to the first to-be-compensated video frames. When the (i+1)th video frame belongs to the first to-be-compensated video frames, the first coding rule is updated according to the first quantity of allocated bits for compensation, the first initial quantization parameter, the first maximum quantization parameter, and the first minimum quantization parameter corresponding to the (i+1)th video frame, and video coding is performed on the (i+1)th video frame. When the (i+1)th video frame does not belong to the first to-be-compensated video frame, a fourth quantization parameter corresponding to the (i+1)th video frame is calculated according to a target bit quantity, and video coding is performed on the (i+1)th video frame according to the fourth quantization parameter, where the target bit quantity is a quantity of bits pre-allocated for the (i+1)th video frame. It should be noted that, the process determining whether the (i+1)th video frame belongs to the first to-be-compensated video frames is equivalent to a process of determining whether the ith frame is a second to-be-compensated video frame in the subsequent step 202.

In this embodiment of this application, the terminal entering the video coding process of the (i+1)th video frame is a process that the terminal starts to perform S101-105 cyclically after coding the (i+1)th video frame. The only difference is that the first coding rule is updated, while a technology for implementing coding is not changed.

Further, as described above, the terminal may further need to adjust the parameters after obtaining the first initial quantization parameter, the first maximum quantization parameter, and the first minimum quantization parameter. Therefore, in this case, the terminal further needs to update the first coding rule according to the first quantity of allocated bits for compensation, the first adjustment initial quantization parameter, the first adjustment maximum quantization parameter, and the first adjustment minimum quantization parameter, and then enter the video coding process of the (i+1)th video frame to start coding the (i+1)th video frame and perform processing after the coding, until coding of an Nth video frame is finished.

It should be noted that, the process of coding, by the terminal, the current video frame by using the first coding rule will be described in the subsequent embodiment.

Further, after S102, as shown in FIG. 5, the video frame coding method provided in this embodiment of this application further includes S106, which is specifically as follows:

S106: Enter the video coding process of the (i+1)th video frame when the ith video frame is not in the scene change state, until coding of the Nth video frame is finished.

After the terminal detects whether the ith video frame is in the scene change state based on the quantity of actually consumed bits, the initial average bit rate of the group of pictures, and the video frame detection rule, the terminal may further detect that the ith video frame is not in the scene change state. Therefore, when the ith video frame is not in the scene change state, the terminal may directly enter the video coding process of the (i+1)th video frame, and directly perform S101-S105 cyclically after coding the (i+1)th video frame, until coding of the Nth video frame is finished.

It can be understood that, during coding of a video frame, the terminal may adaptively adjust a compensation length (that is, a length of a compensation window) of subsequent video frames and a first quantity of allocated bits for compensation according to factors such as a quantity of actually consumed bits and an initial average bit rate of the group of pictures when the current video frame is in the scene change state, and determine an initial quantization parameter, a maximum quantization parameter, and a minimum quantization parameter for subsequent coding of a next frame. In this way, during coding of the next frame, the terminal can compensate, according to the initial quantization parameter, the maximum quantization parameter, and the minimum quantization parameter of the next frame, for extra bits consumed by the previous frame, thereby reducing a peak bit rate per second while maintaining the coding quality of video frames, and keeping the peak bit rate per second stable, so that a video stream is transmitted smoothly.

Figure 6:
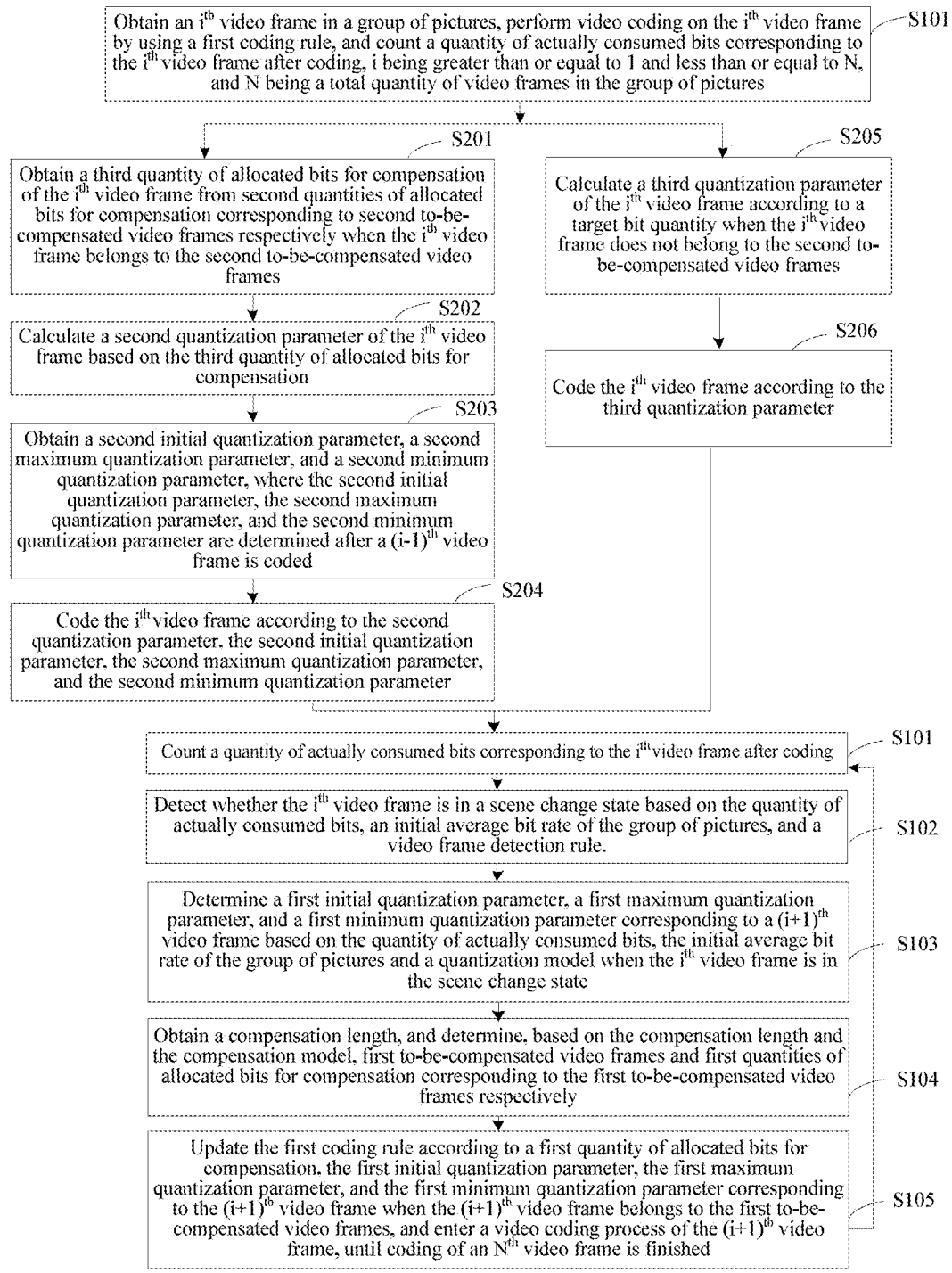
FIG. 6 is a third flowchart of a video frame coding method according to an embodiment of this application.

In some embodiments, in the video frame coding method provided in this embodiment of this application, the process of performing video coding on the ith video frame by using the first coding rule in S101 may include S201-206. As shown in FIG. 6, S201-206 are specifically as follows:

S201: Obtain a third quantity of allocated bits for compensation of the ith video frame from second quantities of allocated bits for compensation corresponding to second to-be-compensated video frames respectively when the ith video frame belongs to the second to-be-compensated video frames, the second to-be-compensated video frames being determined after a video frame prior to the ith video frame is coded.

In some embodiments, the second to-be-compensated video frames are determined after video frames that are prior to the ith video frame and in the scene change state are coded. The third quantity of allocated bits for compensation of the ith video frame is a second quantity of allocated bits for compensation corresponding to the ith video frame which is obtained from the second quantities of allocated bits for compensation corresponding to the second to-be-compensated video frames respectively.

S202: Calculate a second quantization parameter of the ith video frame based on the third quantity of allocated bits for compensation.

In some embodiments, the second quantization parameter of the ith video frame is calculated based on the second quantity of allocated bits for compensation corresponding to the ith video frame.

In this embodiment of this application, the terminal uses the first coding rule when coding the ith video frame because the ith video frame may be in a compensation window of a previous coded frame, or may not need to be compensated. Therefore, for the two situations, the terminal codes the ith video frame in different manners.

Herein, when the ith video frame belongs to the second to-be-compensated video frames, it indicates that there is a video frame in the scene change state among video frames prior to the ith video frame. Therefore, second to-be-compensated video frames corresponding to the video frame and second quantities of allocated bits for compensation corresponding to the second to-be-compensated video frames are already determined according to the coding process in this embodiment. In this case, the terminal may obtain a third quantity of allocated bits for compensation corresponding to the ith video frame from the second quantities of allocated bits for compensation. Then, the terminal may allocate a target bit quantity for the ith video frame according to the third quantity of allocated bits for compensation, and then calculate the second quantization parameter corresponding to the ith video frame according to the target bit quantity.

Specifically, the terminal may divide the ith video frame into M×pixel blocks during coding, M being a positive integer greater than 1. The terminal sets a weight value for each block, and allocates a first target bit quantity for each pixel block respectively according to the weight value and the target bit quantity. Therefore, the terminal may calculate a second quantization parameter corresponding to each pixel block respectively according to the first target bit quantity.

S203: Obtain a second initial quantization parameter, a second maximum quantization parameter, and a second minimum quantization parameter, where the second initial quantization parameter, the second maximum quantization parameter, and the second minimum quantization parameter are determined after a (i−1)th video frame is coded.

S204: Code the ith video frame according to the second quantization parameter, the second initial quantization parameter, the second maximum quantization parameter, and the second minimum quantization parameter.

After the terminal calculates and processes the second quantization parameter of the ith video frame, the terminal obtains the second initial quantization parameter, the second maximum quantization parameter, and the second minimum quantization parameter because the terminal has already calculated the second initial quantization parameter, the second maximum quantization parameter, and the second minimum quantization parameter corresponding to the ith video frame during coding of the (i−1)th video frame, that is, the second initial quantization parameter, the second maximum quantization parameter, and the second minimum quantization parameter are determined after the (i−1)th video frame is coded. Therefore, the terminal can code the ith video frame according to the second quantization parameter, the second initial quantization parameter, the second maximum quantization parameter, and the second minimum quantization parameter.

Specifically, for the first pixel block in the ith video frame, the terminal performs video coding by using the second initial quantization parameter. For any other pixel block except the first pixel block in the ith video frame, the terminal performs video coding by using the second quantization parameters corresponding to the pixel block, and the second quantization parameter is limited by the second maximum quantization parameter and the second minimum quantization parameter. In other words, an upper limit value of the second quantization parameter is the second maximum quantization parameter, and a lower limit value thereof is the second minimum quantization parameter. If a second quantization parameter is in a range of [second minimum quantization parameter, second maximum quantization parameter], the terminal performs video coding on a pixel block corresponding to the second quantization parameter by using the corresponding second quantization parameter. If a second quantization parameter exceeds the second maximum quantization parameter, the terminal performs video coding on a pixel block corresponding to the second quantization parameter by using the second maximum quantization parameter. If a second quantization parameter is less than the second minimum quantization parameter, the terminal performs video coding on a pixel block corresponding to the second quantization parameter by using the second minimum quantization parameter.

It can be understood that, coding performed by the terminal on the ith video frame is limited by the second initial quantization parameter, the second maximum quantization parameter, and the second minimum quantization parameter, so that the quantization parameter is neither excessively high nor excessively low when the ith video frame is coded, thereby ensuring that the video quality of the ith video frame is maintained while a compensation is made for extra bits consumed by the (i−1)th video frame.

It should be noted that, after coding of the ith video frame is finished, the terminal performs S101-105. A coding manner used when the terminal determines that the (i+1)th video frame belongs to the first to-be-compensated video frames is the same as S201-S204.

For example, it is assumed that the current group of pictures includes 1000 video frames, and the terminal detects, during coding of the 200th video frame, that the quantity of bits consumed by the 200th video frame meets a video frame detection rule, and the 200th video frame is in the scene change state. Then, the terminal can calculate a compensation length (assumed to be 5), a third quantity of allocated bits for compensation of the 201st video frame, a second initial quantization parameter, a second maximum quantization parameter, and a second minimum quantization parameter. In this case, because the 201st frame is in a compensation window 200+5, the terminal starts coding the 201st video frame by using the third quantity of allocated bits for compensation, the second initial quantization parameter, the second maximum quantization parameter, and the second minimum quantization parameter. After the coding is finished, the terminal starts to perform the implementation process of S101-S105 on the 201st video frame.

S205: Calculate a third quantization parameter of the ith video frame according to a target bit quantity when the ith video frame does not belong to the second to-be-compensated video frames.

S206: Code the ith video frame according to the third quantization parameter.

In this embodiment of this application, the terminal uses the first factor and coding rule when coding the ith video frame because the ith video frame may be in a compensation window of a previous coded frame, or may not need to be compensated. Therefore, for the two situations, the terminal codes the ith video frame in different manners.

Herein, when the ith video frame does not belong to the second to-be-compensated video frames, the terminal calculates the third quantization parameter of the ith video frame according to the target bit quantity, and then codes the ith video frame according to the third quantization parameter.

It should be noted that, S201-S204 and S205-S206 in the video frame coding method provided in this embodiment of this application are two optional procedures for implementing the process of performing video coding on the ith video frame by using the first coding rule in S101. Sequences of performing S201-S204 and S205-S206 are not limited in the embodiments of this application. The terminal may perform a corresponding step or procedure according to an operation status during implementation and this is not limited in the embodiments of this application.

Figure 7:
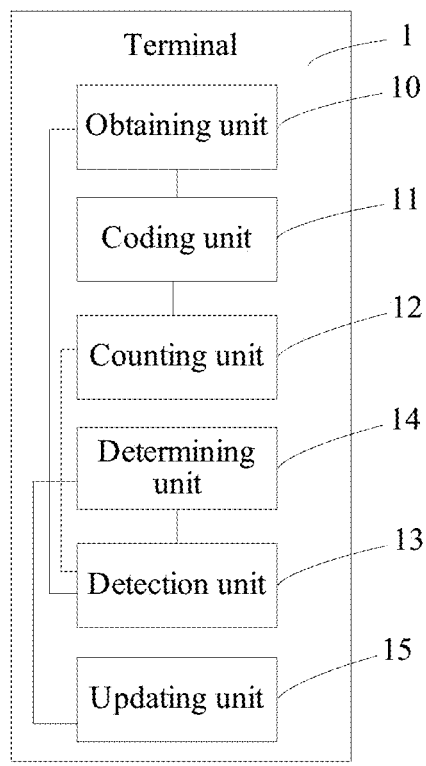
FIG. 7 is a first schematic structural diagram of a terminal according to an embodiment of this application.

Based on the video frame coding method provided in the embodiments of this application, an embodiment of this application provides a terminal 1. As shown in FIG. 7, the terminal 1 may include:

an obtaining unit 10, configured to obtain an $i^{th}$ video frame in a group of pictures;

a coding unit 11, configured to perform video coding on the $i^{th}$ video frame by using a first coding rule;

a counting unit 12, configured to count a quantity of actually consumed bits corresponding to the $i^{th}$ video frame after coding, i being greater than or equal to 1 and less than or equal to N, and N being a total quantity of video frames in the group of pictures;

a detection unit 13, configured to detect whether the $i^{th}$ video frame is in a scene change state based on the quantity of actually consumed bits, an initial average bit rate of the group of pictures, and a video frame detection rule;

a determining unit 14, configured to determine a first initial quantization parameter, a first maximum quantization parameter, and a first minimum quantization parameter corresponding to a $(i+1)^{th}$ video frame based on the quantity of actually consumed bits, the initial average bit rate of the group of pictures and a quantization model when the $i^{th}$ video frame is in the scene change state;

the obtaining unit 10 being further configured to obtain a compensation length;

the determining unit 14 being further configured to determine, based on the compensation length and the compensation model, first to-be-compensated video frames and first quantities of allocated bits for compensation corresponding to the first to-be-compensated video frames respectively; and an updating unit 15, configured to update the first coding rule according to a first quantity of allocated bits for compensation, the first initial quantization parameter, the first maximum quantization parameter, and the first minimum quantization parameter corresponding to the $(i+1)^{th}$ video frame when the $(i+1)^{th}$ video frame belongs to the first to-be-compensated video frames, the coding unit 11 being further configured to enter a video coding process of the $(i+1)^{th}$ video frame, until coding of an $N^{th}$ video frame is finished In some embodiments, the video frame detection rule includes a first video frame detection rule and a second video frame detection rule, where the detection unit 13 is specifically configured to detect a first frame type of the $i^{th}$ video frame;

the obtaining unit 10 is further configured to obtain a remaining average bit rate of the group of pictures when the first frame type is a target frame type; and the detection unit 13 is further specifically configured to detect whether the $i^{th}$ video frame is in the scene change state according to the quantity of actually consumed bits, the initial average bit rate of the group of pictures, the remaining average bit rate of the group of pictures, and the first video frame detection rule.

In some embodiments, the detection unit 13 is further specifically configured to: after detecting the first frame type of the ith video frame, detect whether the ith video frame is in the scene change state according to the quantity of actually consumed bits, the initial average bit rate of the group of pictures, and the second video frame detection rule when the first frame type is not the target frame type.

In some embodiments, the obtaining unit 10 is specifically configured to obtain a third quantity of allocated bits for compensation corresponding to the ith video frame from second quantities of allocated bits for compensation corresponding to second to-be-compensated video frames respectively when the ith video frame belongs to the second to-be-compensated video frames, the second to-be-compensated video frames being determined after video coding is performed on a video frame prior to the ith video frame; calculate a second quantization parameter of the ith video frame based on the third quantity of allocated bits for compensation; and obtain a second initial quantization parameter, a second maximum quantization parameter, and a second minimum quantization parameter, the second initial quantization parameter, the second maximum quantization parameter, and the second minimum quantization parameter being determined after a (i−1)th video frame is coded; and the coding unit 11 is specifically configured to code the $i^{th}$ video frame according to the second quantization parameter, the second initial quantization parameter, the second maximum quantization parameter, and the second minimum quantization parameter.

In some embodiments, the obtaining unit 10 is specifically configured to calculate a third quantization parameter of the ith video frame according to a target bit quantity when the ith video frame does not belong to the second to-be-compensated video frames; and the coding unit 11 is specifically configured to code the $i^{th}$ video frame according to the third quantization parameter.

In some embodiments, the terminal 1 further includes an adjustment unit 16, where the adjustment unit 16 is configured to: after the first initial quantization parameter, the first maximum quantization parameter, and the first minimum quantization parameter corresponding to the $(i+1)^{th}$ video frame are determined based on the quantity of actually consumed bits the initial average bit rate of the group of pictures, and the quantization model, adjust the first initial quantization parameter, the first maximum quantization parameter, and the first minimum quantization parameter according to a quantization adjustment model, to obtain a first adjustment initial quantization parameter, a first adjustment maximum quantization parameter, and a first adjustment minimum quantization parameter, when the quantity of actually consumed bits and a target bit quantity meet a ratio condition.

In some embodiments, the updating unit 15 is further configured to update the first coding rule according to the first quantity of allocated bits for compensation, the first adjustment initial quantization parameter, the first adjustment maximum quantization parameter, and the first adjustment minimum quantization parameter.

In some embodiments, the coding unit 11 is further configured to: after it is detected whether the ith video frame is in the scene change state based on the quantity of actually consumed bits, the initial average bit rate of the group of pictures, and the video frame detection rule, enter the video coding process of the (i+1)th video frame when the ith video frame is not in the scene change state, until coding of the Nth video frame is finished It can be understood that, when coding a video frame, the terminal may adaptively adjust a compensation length (that is, a length of a compensation window) of subsequent video frames and a first quantity of allocated bits for compensation according to factors such as a quantity of actually consumed bits and an initial average bit rate of the group of pictures when the current video frame is in the scene change state, and determine an initial quantization parameter, a maximum quantization parameter, and a minimum quantization parameter for subsequent coding of a next frame. In this way, during coding of the next frame, the terminal can compensate, according to the initial quantization parameter, the maximum quantization parameter, and the minimum quantization parameter of the next frame, for extra bits consumed by the previous frame, thereby reducing a peak bit rate per second while maintaining the coding quality of video frames, and keeping the peak bit rate per second stable, so that a video stream is transmitted smoothly.

Figure 8:
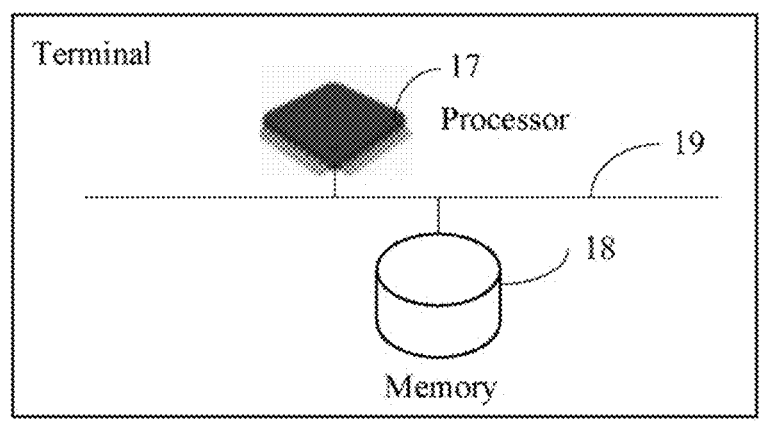
FIG. 8 is a second schematic structural diagram of a terminal according to an embodiment of this application.

Based on the video frame coding method provided in the embodiments of this application, as shown in FIG. 8, an embodiment of this application provides a terminal, including: a processor 17, a memory 18, and a communications bus 19. The memory 18 is connected to the processor 17 through the communications bus 19. The processor 17 is configured to invoke a video frame coding-related program stored in the memory 18 to perform the following steps:

obtaining an $i^{th}$ video frame in a group of pictures, performing video coding on the $i^{th}$ video frame by using a first coding rule, and counting a quantity of actually consumed bits corresponding to the $i^{th}$ video frame after coding, i being greater than or equal to 1 and less than or equal to N, and N being a total quantity of video frames in the group of pictures; detecting whether the $i^{th}$ video frame is in a scene change state based on the quantity of actually consumed bits, an initial average bit rate of the group of pictures, and a video frame detection rule; determining a first initial quantization parameter, a first maximum quantization parameter, and a first minimum quantization parameter corresponding to a $(i+1)^{th}$ video frame based on the quantity of actually consumed bits, the initial average bit rate of the group of pictures and a quantization model when the $i^{th}$ video frame is in the scene change state; obtaining a compensation length, and determining, based on the compensation length and the compensation model, first to-be-compensated video frames and first quantities of allocated bits for compensation corresponding to the first to-be-compensated video frames respectively; and updating the first coding rule according to a first quantity of allocated bits for compensation, the first initial quantization parameter, the first maximum quantization parameter, and the first minimum quantization parameter corresponding to the $(i+1)^{th}$ video frame when the $(i+1)^{th}$ video frame belongs to the first to-be-compensated video frames, and entering a video coding process of the $(i+1)^{th}$ video frame, until coding of an $N^{th}$ video frame is finished.

In some embodiments, the video frame detection rule includes a first video frame detection rule and a second video frame detection rule; and the processor 17 is specifically configured to detect a first frame type of the $i^{th}$ video frame; and obtain a remaining average bit rate of the group of pictures when the first frame type is a target frame type; and detect whether the $i^{th}$ video frame is in the scene change state according to the quantity of actually consumed bits, the initial average bit rate of the group of pictures, the remaining average bit rate of the group of pictures, and the first video frame detection rule.

In some embodiments, the processor 17 is further specifically configured to: after detecting the first frame type of the ith video frame, detect whether the ith video frame is in the scene change state according to the quantity of actually consumed bits, the initial average bit rate of the group of pictures, and the second video frame detection rule when the first frame type is not the target frame type.

In some embodiments, the processor 17 is specifically configured to: obtain a third quantity of allocated bits for compensation corresponding to the ith video frame from second quantities of allocated bits for compensation corresponding to second to-be-compensated video frames respectively when the ith video frame belongs to the second to-be-compensated video frames, the second to-be-compensated video frames being determined after a video frame prior to the ith video frame is coded; calculate a second quantization parameter of the ith video frame based on the third quantity of allocated bits for compensation corresponding to the ith video frame; obtain a second initial quantization parameter, a second maximum quantization parameter, and a second minimum quantization parameter, the second initial quantization parameter, the second maximum quantization parameter, and the second minimum quantization parameter being determined after a (i–1)th video frame is coded; and code the ith video frame according to the second quantization parameter, the second initial quantization parameter, the second maximum quantization parameter, and the second minimum quantization parameter.

In some embodiments, the processor 17 is specifically configured to calculate a third quantization parameter of the ith video frame according to a target bit quantity when the ith video frame does not belong to the second to-be-compensated video frames; and code the ith video frame according to the third quantization parameter.

In some embodiments, the processor 17 is further configured to: after the first initial quantization parameter, the first maximum quantization parameter, and the first minimum quantization parameter corresponding to the (i+1)th video frame are determined based on the quantity of actually consumed bits the initial average bit rate of the group of pictures, and the quantization model, adjust the first initial quantization parameter, the first maximum quantization parameter, and the first minimum quantization parameter according to a quantization adjustment model, to obtain a first adjustment initial quantization parameter, a first adjustment maximum quantization parameter, and a first adjustment minimum quantization parameter.

In some embodiments, the processor 17 is further configured to update the first coding rule according to the first quantity of allocated bits for compensation, the first adjustment initial quantization parameter, the first adjustment maximum quantization parameter, and the first adjustment minimum quantization parameter In some embodiments, the processor 17 is further configured to after it is detected whether the ith video frame is in the scene change state based on the quantity of actually consumed bits, the initial average bit rate of the group of pictures, and the video frame detection rule, enter the video coding process of the (i+1)th video frame when the ith video frame is not in the scene change state, until coding of the Nth video frame is finished.

In some embodiments, the processor 17 is further configured to determine whether the (i+1)th video frame belongs to the first to-be-compensated video frames, update the first coding rule according to the first quantity of allocated bits for compensation corresponding to the (i+1)th video frame, the first initial quantization parameter, the first maximum quantization parameter, and the first minimum quantization parameter when the (i+1)th video frame belongs to the first to-be-compensated video frame, and perform video coding on the (i+1)th video frame; and calculate a fourth quantization parameter of the $(i+1)^{th}$ video frame according to a target bit quantity when the $(i+1)^{th}$ video frame does not belong to the first to-be-compensated video frames, the target bit quantity being a quantity of bits pre-allocated for the $(i+1)^{th}$ video frame, and perform video coding on the $(i+1)^{th}$ video frame according to the fourth quantization parameter.

It should be noted that, the process determining whether the (i+1)th video frame belongs to the first to-be-compensated video frames is equivalent to a process of determining whether the ith frame is a second to-be-compensated video frame. It can be understood that, during coding of a video frame, the terminal may adaptively adjust a compensation length (that is, a length of a compensation window) of subsequent video frames and a first quantity of allocated bits for compensation according to factors such as a quantity of actually consumed bits and an initial average bit rate of the group of pictures when the current video frame is in the scene change state, and determine an initial quantization parameter, a maximum quantization parameter, and a minimum quantization parameter for subsequent coding of a next frame. In this way, during coding of the next frame, the terminal can compensate, according to the initial quantization parameter, the maximum quantization parameter, and the minimum quantization parameter of the next frame, for extra bits consumed by the previous frame, thereby reducing a peak bit rate per second while maintaining the coding quality of video frames, and keeping the peak bit rate per second stable, so that a video stream is transmitted smoothly.

In an actual application, the foregoing memory may be a volatile memory such as a random-access memory (RAM), or a non-volatile memory, such as a read-only memory (ROM), a flash memory, a hard disk drive (HDD), or a solid-state drive (SSD), or a combination of the foregoing types of memories, and the memory provides instructions and data for the processor.

The foregoing processor may be at least one of an application specific integrated circuit (ASIC), a digital signal processor (DSP), a digital signal processing device (DSPD), a programmable logic device ((PLD), a field programmable gate array (FPGA), a central processing unit (CPU), a controller, a micro-controller, and a microprocessor. It can be understood that, for different devices, there may be other electronic devices for implementing the function of the foregoing processor, which are not specifically limited in the embodiments of this application.

An embodiment of this application further provides a computer storage medium, which is applied in a terminal. The computer readable storage medium stores one or more video frame coding programs. The one or more video frame coding programs may be executed by one or more processors to implement the methods in Embodiment 1 and Embodiment 2.

A person skilled in the art should understand that the embodiments of this application may be provided as a method, a system, or a computer program product. Therefore, this application may be in a form of a hardware embodiment, a software embodiment, or an embodiment combining software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of processes and/or blocks in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may also be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams The foregoing descriptions are merely exemplary embodiments of this application, but are not intended to limit the protection scope of this application.

What is claimed is:

1. A video frame coding method performed at a terminal having one or more processors and memory storing a plurality of programs to be executed by the one or more processors, the method comprising:

obtaining an ith video frame in a group of pictures, performing video coding on the ith video frame by using a first coding rule according to a frame type of the ith video frame, and counting a quantity of actually consumed bits corresponding to the ith video frame after coding, i being greater than or equal to 1 and less than or equal to N, and N being a total quantity of video frames in the group of pictures;

detecting whether the ith video frame is in a scene change state based on the quantity of actually consumed bits, an initial average bit rate of the group of pictures, and a video frame detection rule;

determining a first initial quantization parameter, a first maximum quantization parameter, and a first minimum quantization parameter corresponding to a (i+1)th video frame based on the quantity of actually consumed bits, the initial average bit rate of the group of pictures and a quantization model when the ith video frame is in the scene change state;

obtaining a length of a compensation window according to a ratio of the quantity of actually consumed bits of the ith video frame and the initial average bit rate of the group of pictures, and determining, based on the length of the compensation window, first to-be-compensated video frames in the compensation window and first quantities of allocated bits for compensation corresponding to the first to-be-compensated video frames respectively; and updating the first coding rule according to a first quantity of allocated bits for compensation, the first initial quantization parameter, the first maximum quantization parameter, and the first minimum quantization parameter corresponding to the (i+1)th video frame when the (i+1)th video frame belongs to the first to-be-compensated video frames in the compensation window, and entering a video coding process of the (i+1)th video frame, until coding of an Nth video frame is finished.

2. The method according to claim 1, wherein the video frame detection rule comprises a first video frame detection rule, and the operation of detecting whether the ith video frame is in a scene change state based on the quantity of actually consumed bits, an initial average bit rate of the group of pictures, and a video frame detection rule comprises:

detecting a frame type of the ith video frame;
obtaining a remaining average bit rate of the group of pictures when the frame type is a target frame type; and
detecting whether the ith video frame is in the scene change state according to the quantity of actually consumed bits, the initial average bit rate of the group of pictures, the remaining average bit rate of the group of pictures, and the first video frame detection rule.

3. The method according to claim 2, wherein the video frame detection rule further comprises a second video frame detection rule, and the method further comprises:

detecting whether the ith video frame is in the scene change state according to the quantity of actually consumed bits, the initial average bit rate of the group of pictures, and the second video frame detection rule when the frame type is not the target frame type.

4. The method according to claim 1, wherein the operation of performing video coding on the ith video frame by using a first coding rule comprises:

obtaining a second quantity of allocated bits for compensation corresponding to the ith video frame from second quantities of allocated bits for compensation corresponding to second to-be-compensated video frames respectively when the ith video frame belongs to the second to-be-compensated video frames, the second to-be-compensated video frames being determined after video coding is performed on a video frame prior to the ith video frame;
calculating a second quantization parameter of the ith video frame based on the second quantity of allocated bits for compensation corresponding to the ith video frame;
obtaining a second initial quantization parameter, a second maximum quantization parameter, and a second minimum quantization parameter, the second initial quantization parameter, the second maximum quantization parameter, and the second minimum quantization parameter being determined after a (i−1)th video frame is coded;
coding the ith video frame according to the second quantization parameter, the second initial quantization parameter, the second maximum quantization parameter, and the second minimum quantization parameter, an upper limit value of the second quantization parameter being the second maximum quantization parameter, and a lower limit value being the second minimum quantization parameter.

5. The method according to claim 4, wherein the operation of performing video coding on the ith video frame by using a first coding rule comprises:

calculating a third quantization parameter of the ith video frame according to a target bit quantity when the ith video frame does not belong to the second to-be-compensated video frames, the target bit quantity being a quantity of bits pre-allocated for the ith video frame; and performing video coding on the ith video frame according to the third quantization parameter.

6. The method according to claim 1, further comprising:

adjusting the first initial quantization parameter, the first maximum quantization parameter, and the first minimum quantization parameter according to a quantization adjustment model, to obtain a first adjustment initial quantization parameter, a first adjustment maximum quantization parameter, and a first adjustment minimum quantization parameter, when the quantity of actually consumed bits and a target bit quantity meet a ratio condition.

7. The method according to claim 6, wherein the operation of updating the first coding rule according to the first quantity of allocated bits for compensation, the first initial quantization parameter, the first maximum quantization parameter, and the first minimum quantization parameter comprises:

updating the first coding rule according to the first quantity of allocated bits for compensation, the first adjustment initial quantization parameter, the first adjustment maximum quantization parameter, and the first adjustment minimum quantization parameter.

8. The method according to claim 1, further comprising:

entering the video coding process of the (i+1)th video frame when the ith video frame is not in the scene change state, until coding of the Nth video frame is finished.

9. A terminal, comprising memory, one or more processors, and a plurality of computer readable instructions stored in the memory that, when executed by the one or more processors, cause the terminal to perform a plurality of operations including:

obtaining an ith video frame in a group of pictures, performing video coding on the ith video frame by using a first coding rule according to a frame type of the ith video frame, and counting a quantity of actually consumed bits corresponding to the ith video frame after coding, i being greater than or equal to 1 and less than or equal to N, and N being a total quantity of video frames in the group of pictures;
detecting whether the ith video frame is in a scene change state based on the quantity of actually consumed bits, an initial average bit rate of the group of pictures, and a video frame detection rule;
determining a first initial quantization parameter, a first maximum quantization parameter, and a first minimum quantization parameter corresponding to a (i+1)th video frame based on the quantity of actually consumed bits, the initial average bit rate of the group of pictures and a quantization model when the ith video frame is in the scene change state;
obtaining a length of a compensation window according to a ratio of the quantity of actually consumed bits of the ith video frame and the initial average bit rate of the group of pictures, and determining, based on the length of the compensation window, first to-be-compensated video frames in the compensation window and first quantities of allocated bits for compensation corresponding to the first to-be-compensated video frames respectively; and
updating the first coding rule according to a first quantity of allocated bits for compensation, the first initial quantization parameter, the first maximum quantization parameter, and the first minimum quantization parameter corresponding to the (i+1)th video frame when the (i+1)th video frame belongs to the first to-be-compensated video frames in the compensation window, and entering a video coding process of the (i+1)th video frame, until coding of an Nth video frame is finished.

10. The terminal according to claim 9, wherein the video frame detection rule comprises a first video frame detection rule, and the operation of detecting whether the ith video frame is in a scene change state based on the quantity of actually consumed bits, an initial average bit rate of the group of pictures, and a video frame detection rule further comprises:
   detecting a frame type of the ith video frame;
   obtaining a remaining average bit rate of the group of pictures when the frame type is a target frame type; and
   detecting whether the ith video frame is in the scene change state according to the quantity of actually consumed bits, the initial average bit rate of the group of pictures, the remaining average bit rate of the group of pictures, and the first video frame detection rule.

11. The terminal according to claim 10, wherein the video frame detection rule further comprises a second video frame detection rule, and the method further comprises:
   detecting whether the ith video frame is in the scene change state according to the quantity of actually consumed bits, the initial average bit rate of the group of pictures, and the second video frame detection rule when the frame type is not the target frame type.

12. The terminal according to claim 9, wherein the operation of performing video coding on the ith video frame by using a first coding rule comprises:
   obtaining a second quantity of allocated bits for compensation corresponding to the ith video frame from second quantities of allocated bits for compensation corresponding to second to-be-compensated video frames respectively when the ith video frame belongs to the second to-be-compensated video frames, the second to-be-compensated video frames being determined after video coding is performed on a video frame prior to the ith video frame;
   calculating a second quantization parameter of the ith video frame based on the second quantity of allocated bits for compensation corresponding to the ith video frame;
   obtaining a second initial quantization parameter, a second maximum quantization parameter, and a second minimum quantization parameter, the second initial quantization parameter, the second maximum quantization parameter, and the second minimum quantization parameter being determined after a (i−1)th video frame is coded;
   coding the ith video frame according to the second quantization parameter, the second initial quantization parameter, the second maximum quantization parameter, and the second minimum quantization parameter, an upper limit value of the second quantization parameter being the second maximum quantization parameter, and a lower limit value being the second minimum quantization parameter.

13. The terminal according to claim 12, wherein the operation of performing video coding on the ith video frame by using a first coding rule comprises:
   calculating a third quantization parameter of the ith video frame according to a target bit quantity when the ith video frame does not belong to the second to-be-compensated video frames, the target bit quantity being a quantity of bits pre-allocated for the ith video frame; and
   performing video coding on the ith video frame according to the third quantization parameter.

14. The terminal according to claim 9, wherein the plurality of operations further comprise:
   adjusting the first initial quantization parameter, the first maximum quantization parameter, and the first minimum quantization parameter according to a quantization adjustment model, to obtain a first adjustment initial quantization parameter, a first adjustment maximum quantization parameter, and a first adjustment minimum quantization parameter, when the quantity of actually consumed bits and a target bit quantity meet a ratio condition.

15. The terminal according to claim 14, wherein the operation of updating the first coding rule according to the first quantity of allocated bits for compensation, the first initial quantization parameter, the first maximum quantization parameter, and the first minimum quantization parameter comprises:
   updating the first coding rule according to the first quantity of allocated bits for compensation, the first adjustment initial quantization parameter, the first adjustment maximum quantization parameter, and the first adjustment minimum quantization parameter.

16. The terminal according to claim 9, wherein the plurality of operations further comprise:
   entering the video coding process of the (i+1)th video frame when the ith video frame is not in the scene change state, until coding of the Nth video frame is finished.

17. A non-transitory computer readable storage medium storing a plurality of instructions in connection with a terminal having one or more processors, wherein the plurality of instructions, when executed by the one or more processors, cause the terminal to perform a plurality of operations including:
   obtaining an ith video frame in a group of pictures, performing video coding on the ith video frame by using a first coding rule according to a frame type of the ith video frame, and counting a quantity of actually consumed bits corresponding to the ith video frame after coding, i being greater than or equal to 1 and less than or equal to N, and N being a total quantity of video frames in the group of pictures;
   detecting whether the ith video frame is in a scene change state based on the quantity of actually consumed bits, an initial average bit rate of the group of pictures, and a video frame detection rule;
   determining a first initial quantization parameter, a first maximum quantization parameter, and a first minimum quantization parameter corresponding to a (i+1)th video frame based on the quantity of actually consumed bits, the initial average bit rate of the group of pictures and a quantization model when the ith video frame is in the scene change state;
   obtaining a length of a compensation window according to a ratio of the quantity of actually consumed bits of the ith video frame and the initial average bit rate of the group of pictures, and determining, based on the length of the compensation window, first to-be-compensated video frames in the compensation window and first quantities of allocated bits for compensation corresponding to the first to-be-compensated video frames respectively; and
   updating the first coding rule according to a first quantity of allocated bits for compensation, the first initial quantization parameter, the first maximum quantization parameter, and the first minimum quantization parameter corresponding to the (i+1)th video frame when the (i+1)th video frame belongs to the first to-be-compensated video frames in the compensation window, and entering a video coding process of the (i+1)th video frame, until coding of an Nth video frame is finished.

18. The non-transitory computer readable storage medium according to claim 17, wherein the video frame detection rule comprises a first video frame detection rule, and the operation of detecting whether the ith video frame is in a scene change state based on the quantity of actually consumed bits, an initial average bit rate of the group of pictures, and a video frame detection rule further comprises:
detecting a frame type of the ith video frame;
obtaining a remaining average bit rate of the group of pictures when the frame type is a target frame type; and
detecting whether the ith video frame is in the scene change state according to the quantity of actually consumed bits, the initial average bit rate of the group of pictures, the remaining average bit rate of the group of pictures, and the first video frame detection rule.

19. The non-transitory computer readable storage medium according to claim 17, wherein the operation of performing video coding on the ith video frame by using a first coding rule comprises:
obtaining a second quantity of allocated bits for compensation corresponding to the ith video frame from second quantities of allocated bits for compensation corresponding to second to-be-compensated video frames respectively when the ith video frame belongs to the second to-be-compensated video frames, the second to-be-compensated video frames being determined after video coding is performed on a video frame prior to the ith video frame;
calculating a second quantization parameter of the ith video frame based on the second quantity of allocated bits for compensation corresponding to the ith video frame;
obtaining a second initial quantization parameter, a second maximum quantization parameter, and a second minimum quantization parameter, the second initial quantization parameter, the second maximum quantization parameter, and the second minimum quantization parameter being determined after a (i−1)th video frame is coded;
coding the ith video frame according to the second quantization parameter, the second initial quantization parameter, the second maximum quantization parameter, and the second minimum quantization parameter, an upper limit value of the second quantization parameter being the second maximum quantization parameter, and a lower limit value being the second minimum quantization parameter.

20. The non-transitory computer readable storage medium according to claim 19, wherein the operation of performing video coding on the ith video frame by using a first coding rule comprises:
calculating a third quantization parameter of the ith video frame according to a target bit quantity when the ith video frame does not belong to the second to-be-compensated video frames, the target bit quantity being a quantity of bits pre-allocated for the ith video frame; and
performing video coding on the ith video frame according to the third quantization parameter.

* * * * *